United States Patent [19]
Faroudja

[11] Patent Number: 5,237,414
[45] Date of Patent: Aug. 17, 1993

[54] VIDEO ENHANCER WITH SEPARATE PROCESSING OF HIGH AND LOW LEVEL TRANSITIONS

[76] Inventor: Yves C. Faroudja, 26595 Anacapa Dr., Los Altos Hills, Calif. 94022

[21] Appl. No.: 844,293

[22] Filed: Mar. 2, 1992

[51] Int. Cl.$^5$ .......................................... H04N 5/208
[52] U.S. Cl. ..................................... 358/162; 358/166
[58] Field of Search .................... 358/36, 37, 166, 162, 358/167

[56] References Cited

U.S. PATENT DOCUMENTS

| | | | |
|---|---|---|---|
| 2,740,071 | 3/1956 | Goldmark et al. | |
| 2,851,522 | 9/1958 | Hollywood | |
| 3,778,543 | 12/1973 | Lowry | |
| 4,030,121 | 6/1977 | Faroudja | 358/37 |
| 4,142,211 | 2/1979 | Faroudja | 358/162 X |
| 4,262,304 | 4/1981 | Faroudja | 358/37 |
| 4,847,681 | 6/1989 | Faroudja et al. | 358/162 X |
| 4,989,090 | 1/1991 | Campbell et al. | |
| 5,014,119 | 5/1991 | Faroudja | |
| 5,146,319 | 9/1992 | Engel et al. | 358/166 X |

OTHER PUBLICATIONS

"Philips Colour Telecine System" brochure, pp. 25-27.
Goldmark, Peter C. and John M. Hollywood, "A New Technique for Improving the Sharpness of Television Pictures," *Proceedings of the I.R.E.*, Oct. 1951, pp. 1314-1322.
Rzeszewski, T. S. and P. H. Wyant, "Picture Crispening by Adaptive Digital Signal Processing," *IEEE*, 1987.
Thiele, A. N., "Horizontal Aperture Equalization," *Radio and Electronic Engineer*, vol. 40, No. 4, Oct. 1970, p. 193.
"Mark IV Automatic Image Enhancer," CBS Laboratories Technical Bulletin, Mar. 1974.

*Primary Examiner*—Mark R. Powell
*Attorney, Agent, or Firm*—Thomas A. Gallagher

[57] ABSTRACT

A full dynamic-range video enhancer employs a detail process for lower level transitions in a video signal stream and a spectrum expander for higher level transitions. The characteristics of the detail processor enhancement signal are such that when combined with the main signal path, the rise times of lower level transitions are shortened, but with substantially no accompanying increase in the overall spectral bandwidth. The characteristics of the spectrum expander enhancement signal are such that when combined with the main signal path, the rise times of higher level transitions are shortened, but with an accompanying increase in the overall spectral bandwidth while maintaining low preshoot and overshoot characteristics. For a rising transition level the video enhancer provides enhancement initially by the detail processor, then a combination of the detail processor and the spectrum expander, and then by the spectrum expander. The video enhancer may advantageously be used in a television receiver following a line doubler.

22 Claims, 10 Drawing Sheets

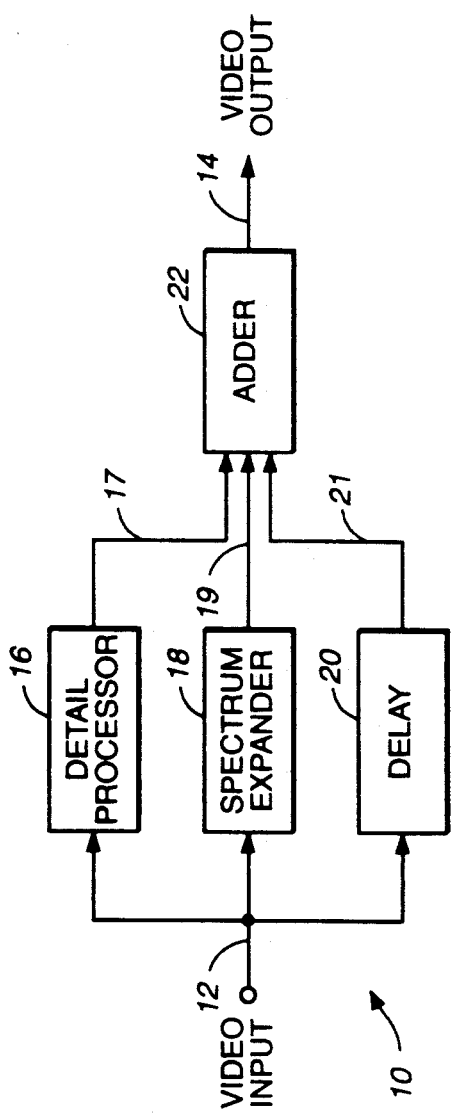
FIG._1
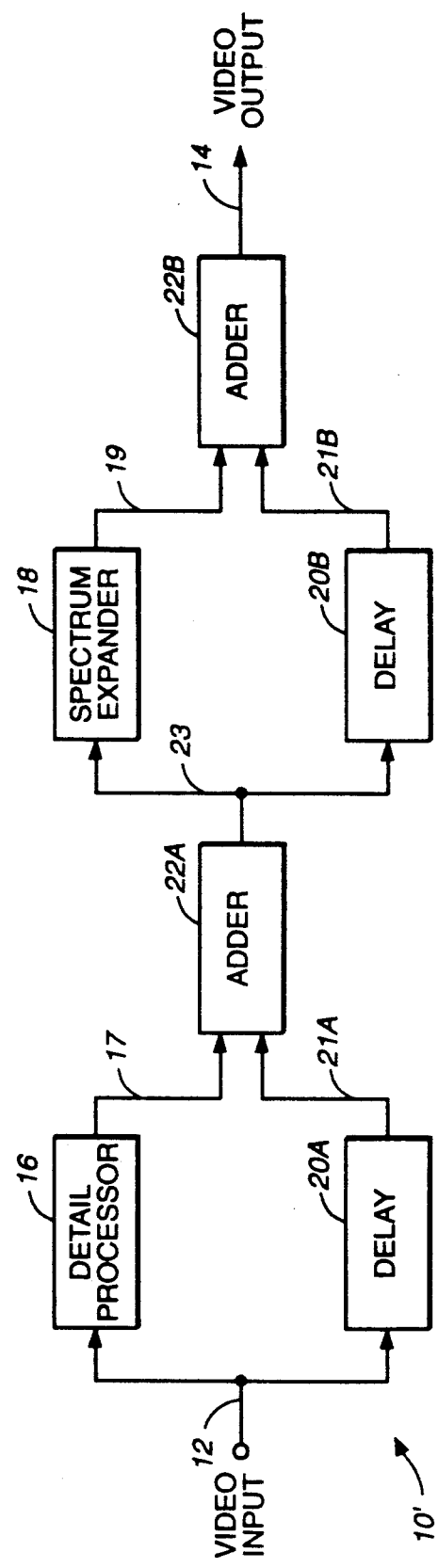
FIG._6

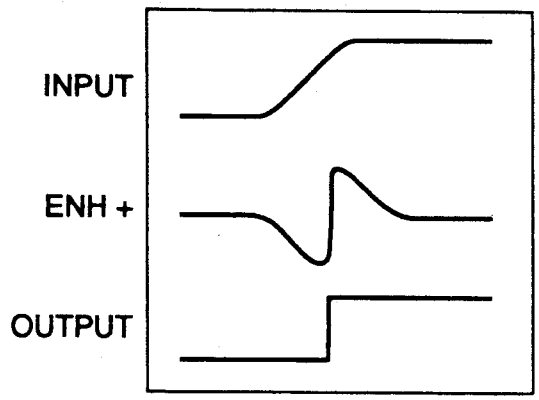
FIG._2A
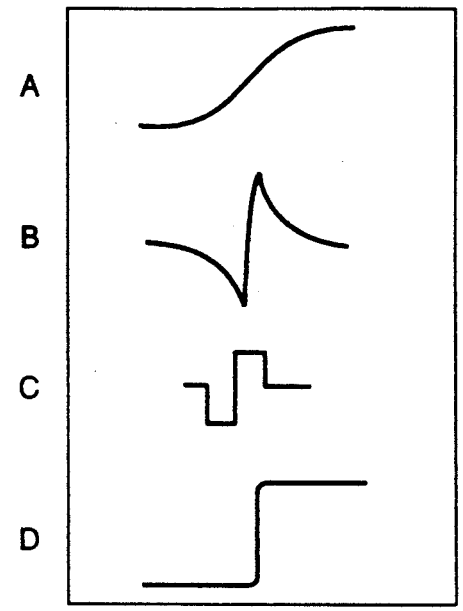
FIG._2E
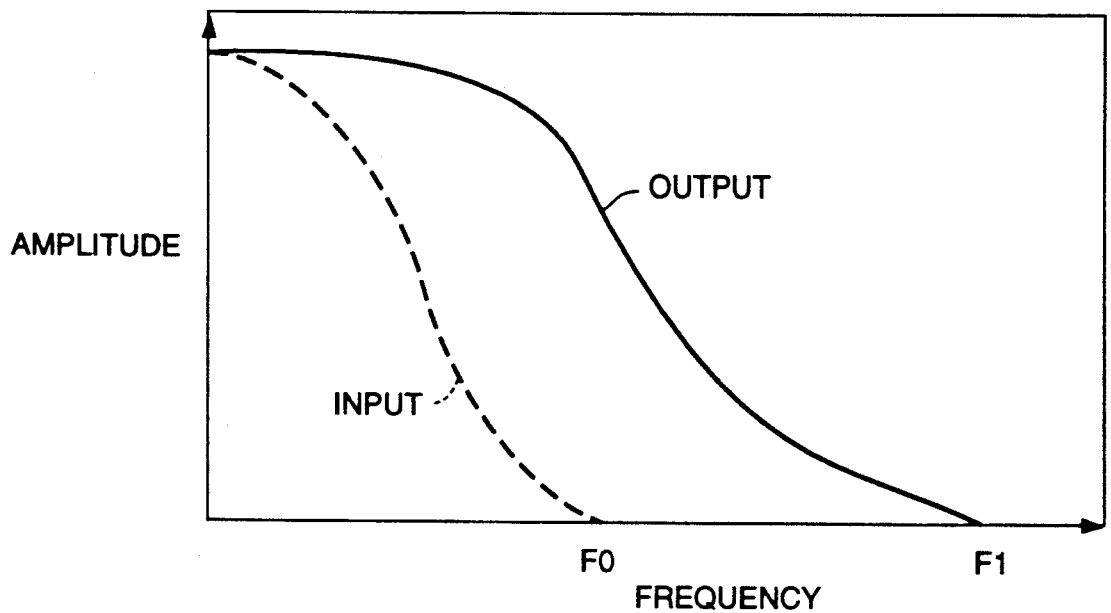
FIG._2B

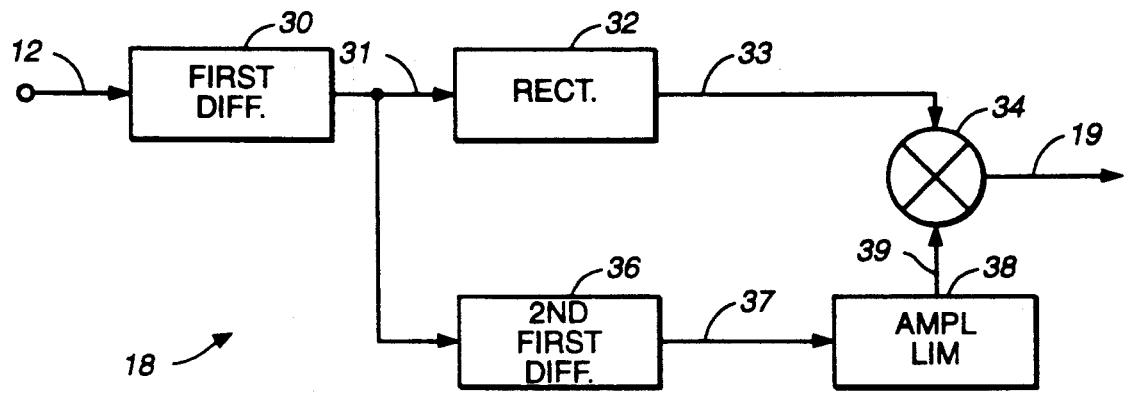
FIG._2C
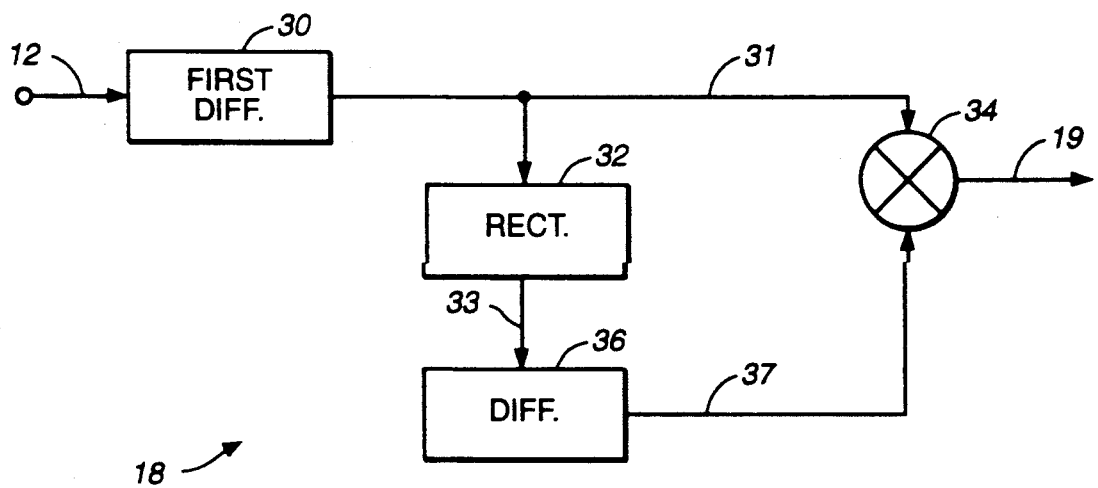
FIG._2D

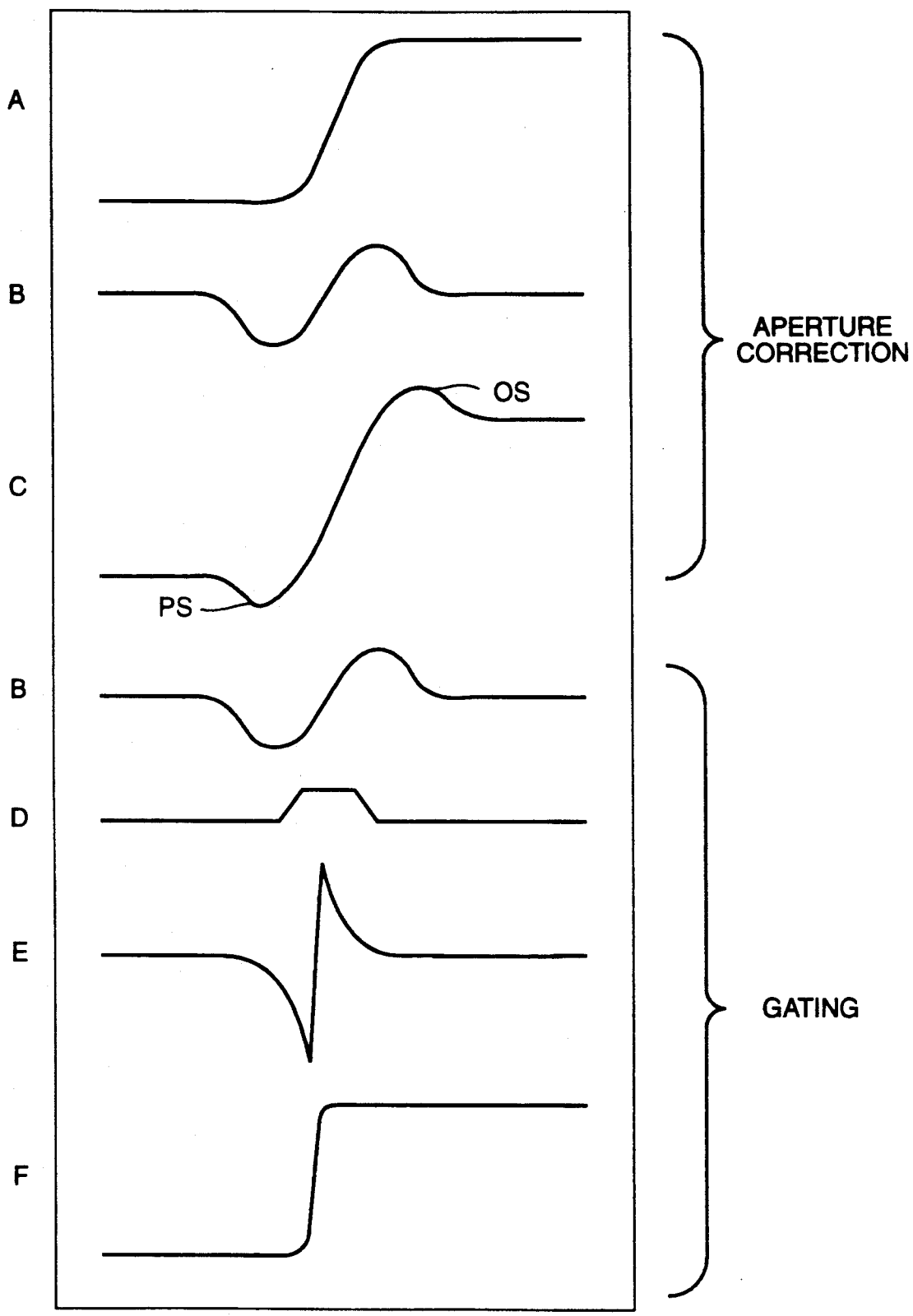
FIG._3

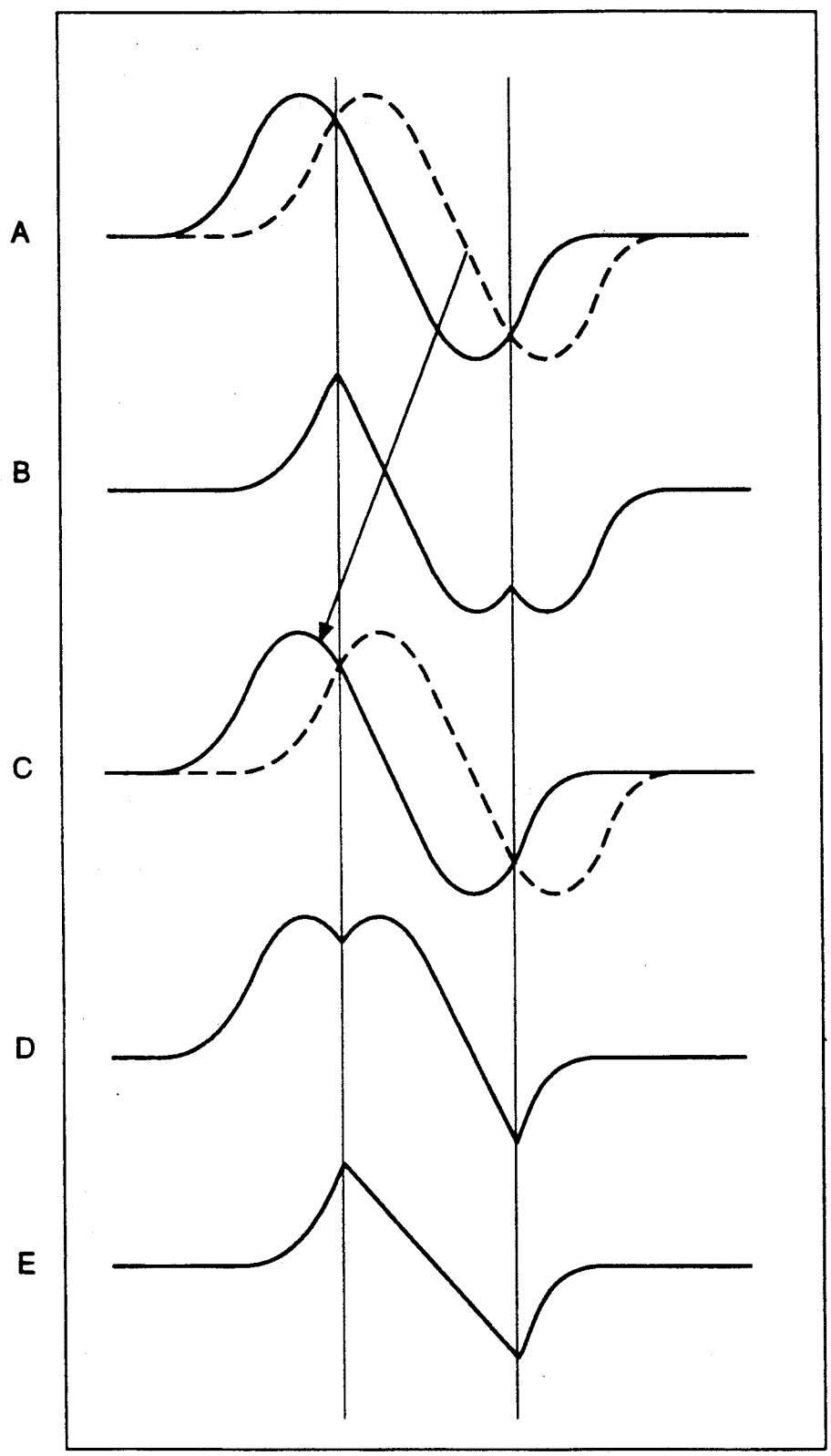
FIG._4

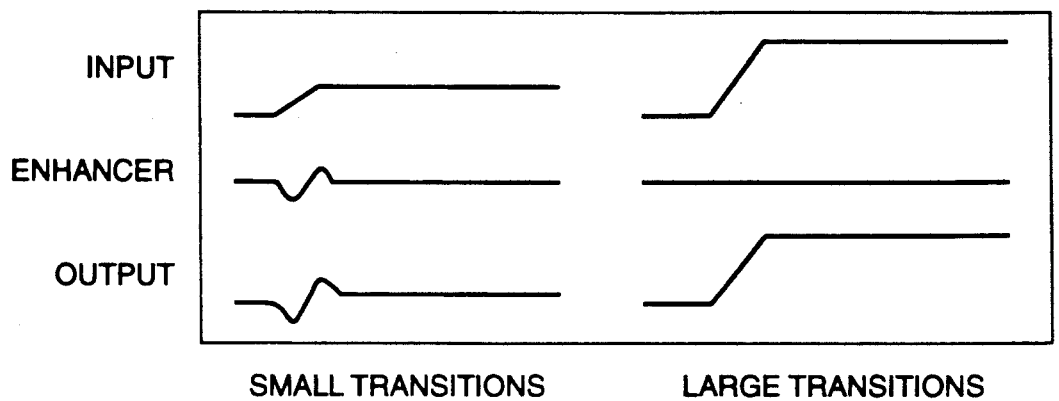
FIG._5A
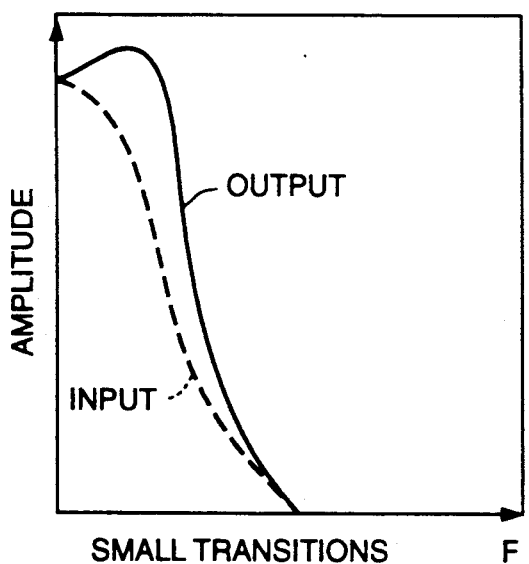
FIG._5B
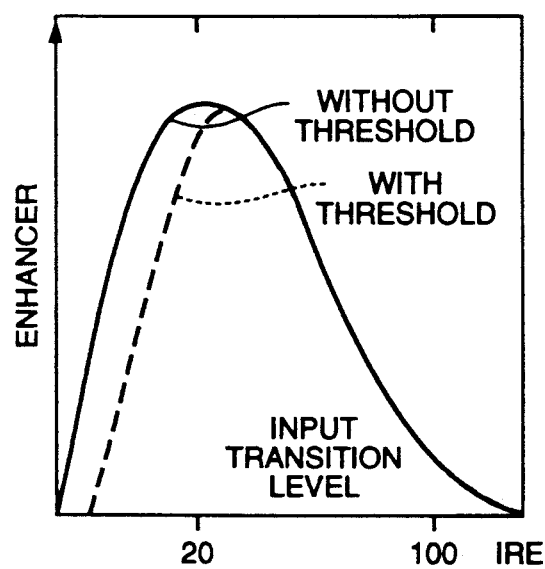
FIG._5C

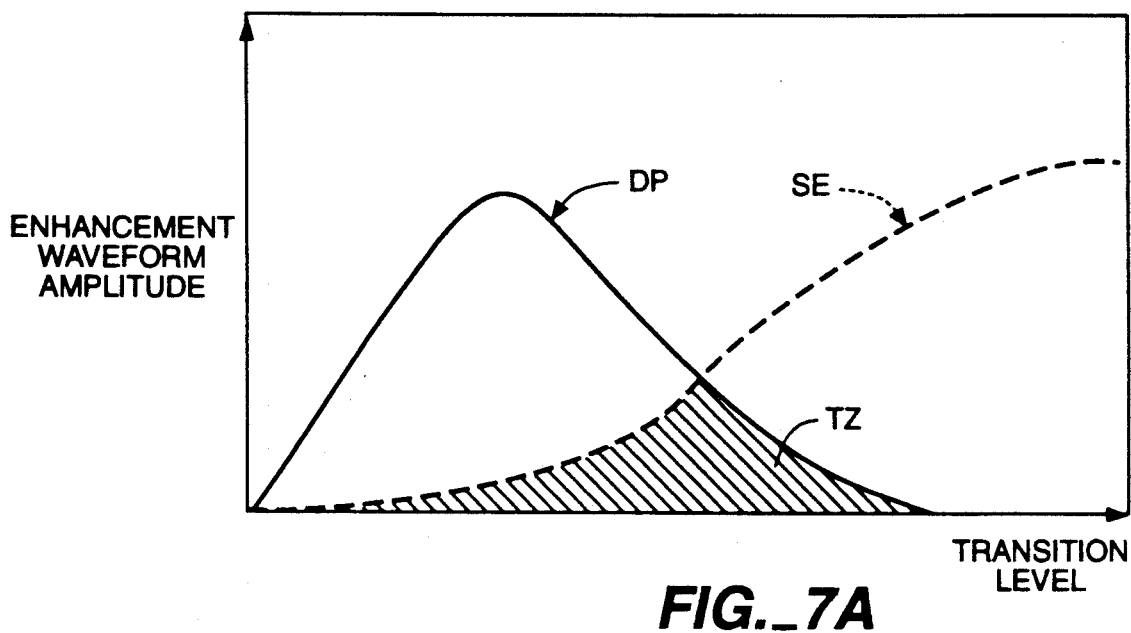
FIG._7A
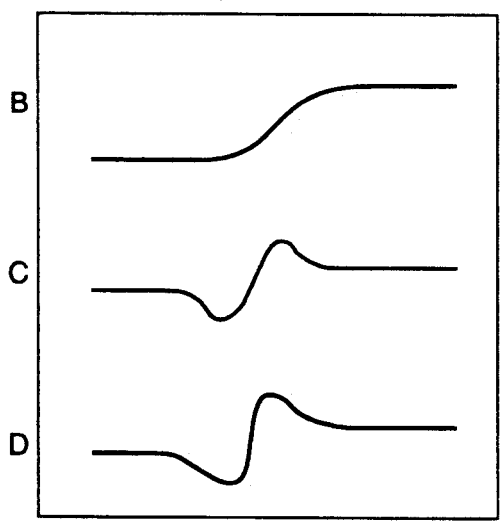
FIG._7B
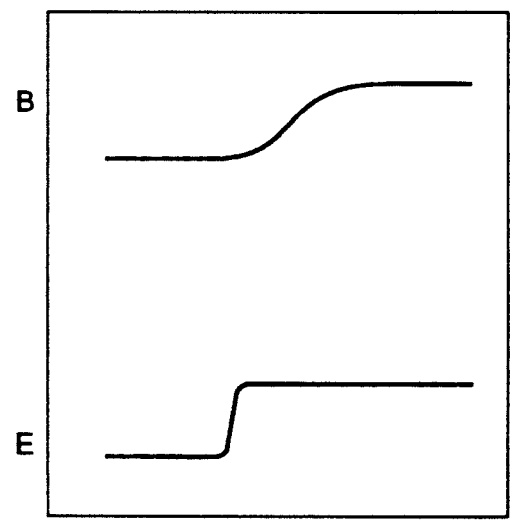
FIG._7C

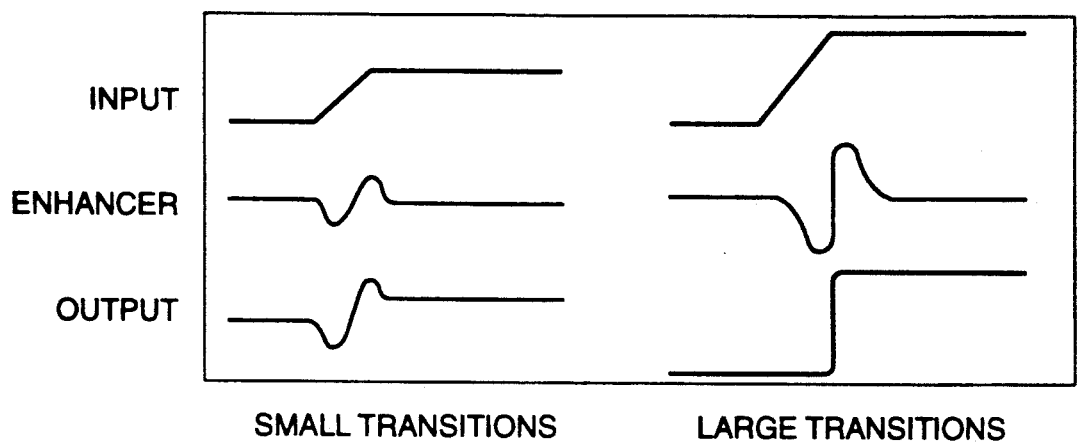
FIG._8A
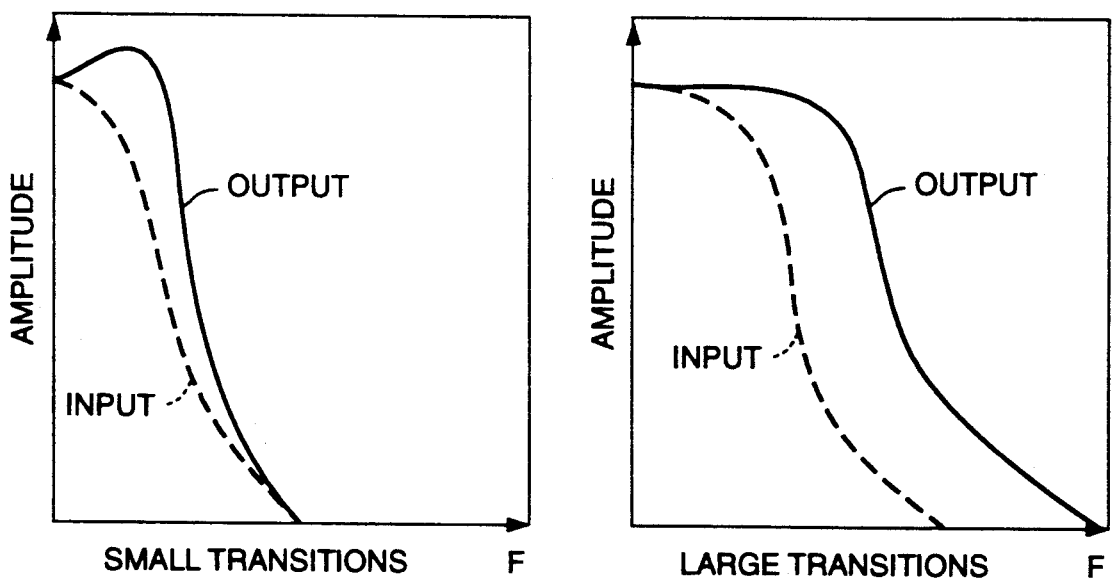
FIG._8B  FIG._8C

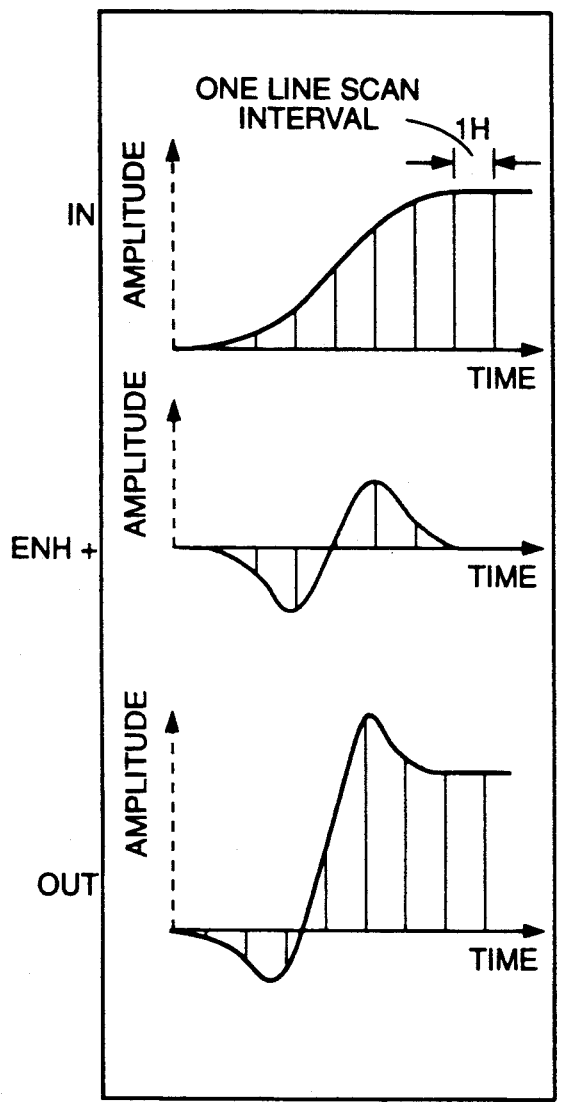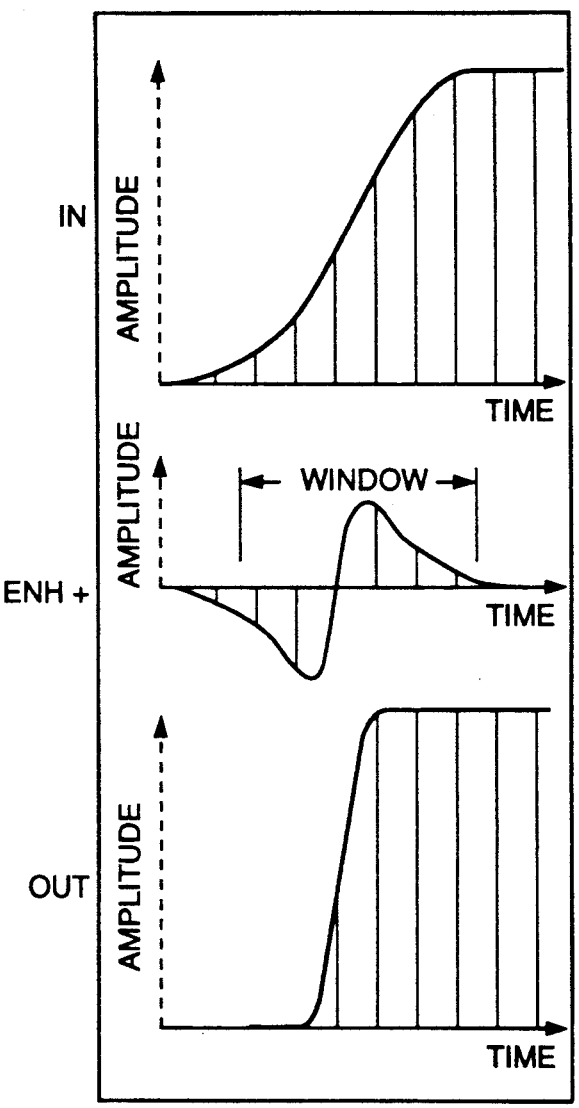
FIG._9A  FIG._9B

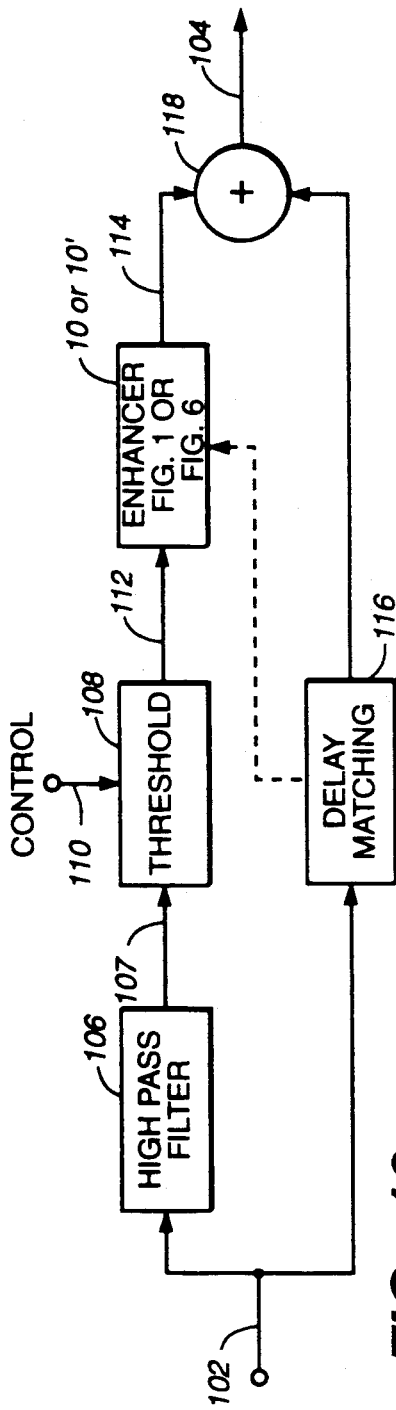
FIG._10
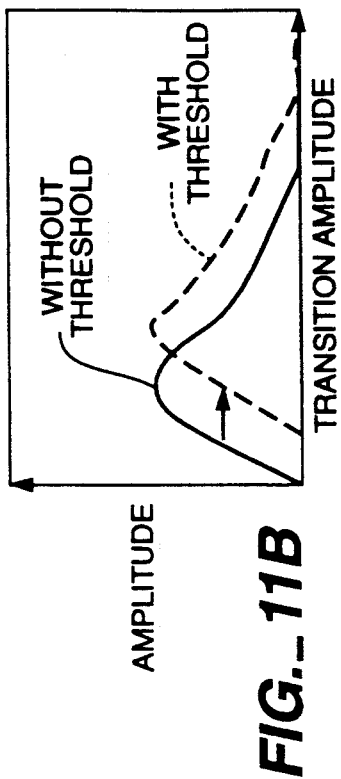
FIG._11B
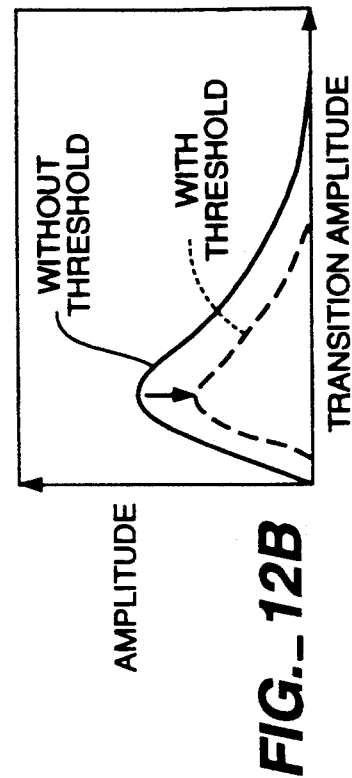
FIG._12B
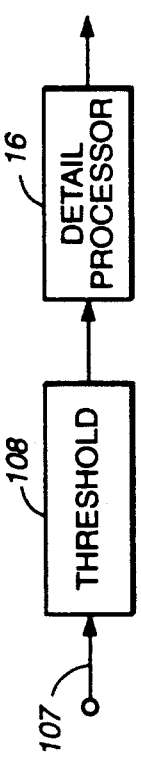
FIG._11A
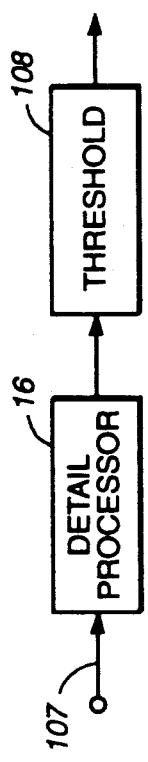
FIG._12A

VIDEO ENHANCER WITH SEPARATE PROCESSING OF HIGH AND LOW LEVEL TRANSITIONS

FIELD OF THE INVENTION

The present invention relates to television signal processing methods and apparatus for improving the sharpness of television pictures. More particularly, the present invention relates to methods and apparatus for achieving increased sharpness with full dynamic range enhancement processing techniques. In the case of color television, the present invention is applicable to the luminance signal channel, the chrominance signal channel, or both.

BACKGROUND OF THE INVENTION

This invention relates to television and is directed to method and apparatus for improving the sharpness of television pictures. The reproduction of geometrical details is an important problem in television. Many factors are involved, but when the number of scanning lines per frame and the number of frames per second have been fixed, the horizontal and vertical resolutions are largely a function of system bandwidth. As such, a bandwidth is perfectly defined. In a given standard, measured horizontal and vertical resolutions are finite and well established.

Resolution in the horizontal domain is frequently expressed and understood in terms of maximum signal bandwidth, while resolution in the vertical domain is a function of the number of scan line samples over which the vertical transition is manifested, the sampling being at the line scan repetition rate. Since a television picture display occupies a given two-dimensional space, picture resolution is ultimately measured by the amount of display space in the picture's spatial dimension which is required for or occupied by the picture transition. This space is frequently referred to as "rise time". The less space required for rise time, the sharper the picture will appear. Thus, when considered in terms of shortened rise times, improved picture resolution transcends the differences otherwise existing between the horizontal domain and the vertical domains.

For example, the NTSC standard specifies a 525 line per frame scanning rate, and a 4.2 MHz luminance bandwidth. In these specified conditions, the vertical resolution cannot exceed 240 scan lines, while the horizontal resolution is limited to the equivalent of approximately 330 scan lines. These resolution limits were perfectly adequate when the picture displays were small and of limited sharpness. However, today, with the arrival of high precision, bright and well focused large screen displays (such as television projection systems), these limits are no longer adequate, and it is necessary to give to the viewer the appearance of a high resolution picture without increasing the bandwidth requirements constraining the television picture source.

Many attempts have been made in the prior art to increase the apparent sharpness of a television picture without increasing bandwidth throughout the television system.

A first type of device known in the art for increasing apparent picture resolution to some extent was image enhancers and aperture equalization systems. Those systems are described, for example, by A. N. Thiele in an article entitled "Horizontal Aperture Equalization,", *Radio and Electronic Engineer*, Vol. 40, No. 4, October 1970, page 193; and in CBS Laboratories Mark IV Automatic Image Enhancer Technical Bulletin, March 1974, and Philips Colour Telecine System brochure, page 25-27. The devices and methods described in these references generally operated in a strictly linear fashion. A high frequency signal was derived from the input transition and was thereafter added back to the transition without envelope delay error and with proper phasing. In those conditions the resultant output transition was apparently shorter in duration than the input transition. However, those prior approaches had at least two drawbacks.

A first drawback was that noise, as well as the signal transition, became enhanced in the process. In order to avoid this undesirable result, some prior devices employed an amplitude threshold in the enhancement path. Unfortunately, for low level transition signals below the threshold, there would be no enhancement: i.e., no apparent improvement in low contrast picture details.

A second drawback was that transition sharpening could not be obtained with those approaches without adding "preshoot" and "overshoot" which are directly analogous to pre-ringing and post-ringing artifacts surrounding the original transition. While actual duration of a transition did not vary, the passage from black to white did not happen in the same fashion. The visible transition zone on the display screen was as wide as before, but objects being displayed seemed to be surrounded with black and white margins. Thus, the preshoot and overshoot artifacts gave the resultant picture display an unnatural or cartoon-like appearance.

In order to avoid introducing visible overshoots, the present inventor presented a technique which defeated, in practice, the effect of aperture correction for large transitions. These improvements are described in the present inventor's prior U.S. Pat. Nos. 4,262,304 and 4,847,681. While visible overshoots disappeared with the patented approaches, large magnitude horizontal and vertical transitions in the picture image were no longer sharpened.

A second type of device found in the prior art is a video "crispener". A crispener is a transition processing device which generates nonlinearly shortened duration enhancement components derived from the original picture transition and combines the enhancement components with the transition without introducing preshoot and overshoot. The video crispener may thus be thought of as a picture signal spectrum expander. Examples of prior art video crispeners are described in U.S. Pat. No. 2,740,071 to Goldmark and Reeves, U.S. Pat. No. 2,851,522 to Hollywood, and in an article by Goldmark and Hollywood entitled "A New Technique for Improving the Sharpness of Television Pictures". *Proceedings of the IRE*, October 1951, p. 1314. The present inventor presented an improvement in video crispening techniques in his prior U.S. Pat. No. 4,030,121.

As video crispeners act, in effect, as spectrum expanders (or the equivalent thereof in the vertical domain), they achieve a reduction of the transition duration (rise time) without introducing preshoot and overshoot. However, video crispeners are relatively inefficient in improving the sharpness of small picture details resulting from small transitional levels in the picture signal.

A hitherto unsolved need has therefore arisen for an enhancement technique which reduces the rise time of a horizontal or vertical transition without regard to its transitional level and which does not introduce any visible image artifacts, such as noise, overshoots, ringing and the like.

SUMMARY OF THE INVENTION WITH OBJECTS

A general object of the present invention is to provide video picture image enhancement methods and systems which perform in a manner overcoming limitations and drawbacks of the prior art.

Another more specific object of the present invention is to provide a system for performing video enhancement in the horizontal and vertical domains in order to obtain a resulting picture sharpness which is subjectively impossible to distinguish from the picture sharpness of a strictly linearly processed video signal having a significantly higher bandwidth (horizontal domain), a significantly higher number of scanning lines (vertical domain), or both.

A further object of the present invention is to provide a video enhancer system which does not exhibit visual preshoot or overshoot artifacts, which does not increase noise level, and which enhances in equal relative measure all incoming picture signal transitions regardless of level, so that the resultant picture display will appear to be naturally sharp without "flatness" (lack of small details enhancement) or "cartoon" (overshoots on large transitions) effects.

Another object of the present invention is to provide enhancement of small transitions by detail processing techniques, to provide enhancement of large picture image edges by spectral expansion techniques (or the equivalent thereof in the vertical domain) and to provide a combination of both techniques for transitions which are of medium amplitude within a smooth transition region lying between a low level detail processing region and a high level spectral expansion region.

One more object of the present invention is to provide full dynamic range enhancement by detail processing and spectral expansion circuits arranged in parallel or in series within a signal processing path.

Yet another object of the present invention is to provide full dynamic range video enhancement processes included in the horizontal domain, the vertical domain, and preferably both domains.

In one facet of the invention, a video enhancer is provided for enhancing transitions within a video signal stream throughout a full dynamic range of the transitions. The enhancer includes an input for receiving the stream and an output, a main signal path between the input and the output, a first enhancement circuit in parallel with the main path for generating an enhancement of lower level transition components having linear characteristics derived from and corresponding to lower level transitions within the video signal stream and for adding the enhancement of lower level transitions component to the main signal path in order to reduce the rise times of said corresponding lower level transitions, a second enhancement circuit in parallel with the main path for generating an enhancement of higher level transitions component having nonlinear characteristics of shorter duration than the transition rise times of corresponding higher level transitions within the video signal stream and for adding the said enhancement of higher level transitions component to the main signal path in order to reduce the rise times of said corresponding higher level transitions while maintaining low preshoot and overshoot characteristics, and a delay circuit within the main signal path to compensate for delays occurring in the first transition enhancement circuit and the second transition enhancement circuit.

As one aspect of this facet of the invention the video enhancer is adapted progressively to transition the enhancement output smoothly from the output of the first, lower level transition enhancement circuit to the output of the second, higher level transition enhancement circuit as a function of signal transition amplitude levels within the signal stream.

As another aspect of this facet of the invention, the first, lower level transition enhancement circuit comprises a detail processor and the second, higher level transition enhancement circuit comprises a spectrum expander.

As a further aspect of this facet of the invention, the first, lower level transition enhancement circuit is connected in parallel with the second, higher level transition enhancement circuit.

As one more aspect of this facet of the invention, the first, lower level transition enhancement circuit is connected in series with the second, higher level transition enhancement circuit, and the delay circuit includes one delay for delay matching the main signal path with delays of the first transition enhancement circuit and further includes another delay for delay matching the main signal path with delays of the second transition enhancement circuit. As a related aspect, the first, lower level transition enhancement circuit is connected upstream of the second, higher level transition enhancement circuit in the series configuration.

As one further aspect of this facet of the invention, the first, lower level transition enhancement circuit is implemented with digital electronic circuitry and the second, higher level transition enhancement circuit is implemented with analog electronic circuitry.

As yet another aspect of this facet of the invention, both enhancement circuits are implemented with digital electronic circuitry.

As a further aspect of this facet of the invention, the first, lower level transition enhancement circuit and the second, higher level transition enhancement circuit operate in either a horizontal domain or a vertical domain of the video signal stream, or both domains.

As one more aspect of this facet of the invention, the video enhancer is included within a television receiver having a scan line doubler. In this aspect, the higher level transition enhancement circuit is preferably downstream of said scan line doubler. As a related aspect, the lower level transition enhancement circuit and the scan line doubler are implemented with digital circuitry and the higher level transition enhancement circuit is implemented with analog circuitry.

As one more aspect of this facet of the invention, the main signal path comprises either or both a luminance path and a chroma path of a color composite picture signal.

In yet one more aspect of this facet of the invention, the video enhancer further comprises a controlled threshold circuit for providing a threshold control for controlling operation of the lower level transition enhancement circuit. In this aspect, the threshold circuit may be upstream of the lower level transition enhancement circuit with the result that adjustment of the threshold control of the threshold circuit displaces a transfer characteristic of the lower level transition enhancement circuit within a range of transition amplitude. In a related aspect, the threshold circuit may be downstream of the lower level transition enhancement circuit, and adjustment of the threshold control of the threshold circuit controls the magnitude of the transfer characteristic of the lower level transition enhancement circuit.

As another facet of the present invention, a full-dynamic-range television signal enhancement system comprises an input, an output, a summing circuit connected to the output, a main path between the input and the summing circuit, the main path including delay matching circuit. An enhancement path between the input and the summing circuit and including in series from the input to the summing circuit a high pass filter, a controlled threshold circuit for establishing a minimum threshold level characteristic for signals passing therethrough, a video enhancer for enhancing transitions within the enhancement path throughout a full dynamic range of the transitions and including a lower level transition enhancement circuit for generating a lower level enhancement component with linear characteristics derived from lower level transitions within the enhancement path and for adding the lower level enhancement component to the enhancement path in order to increase the level of frequency components located at a high frequency end of a spectrum thereof, and a higher level transition enhancement circuit in parallel with the enhancement path for enhancing with nonlinear characteristics by generating a higher level enhancement component from harmonic components of the frequency components located at a high frequency end of a higher level spectrum thereof and for adding the higher level enhancement component to the enhancement path. The composite enhancement path includes the lower level enhancement component and the higher level enhancement component, and these two components are combined with the main path in the summing circuit.

As one more facet of the present invention, a method provides full-dynamic-range enhancement to a video signal stream and includes the steps of:

generating with linear signal processing techniques a lower level enhancement component with linear characteristics derived from lower level transitions within the video signal stream, combining the lower level enhancement component with the video signal stream in order to increase the level of frequency components located at a high frequency end of a spectrum thereof, generating with nonlinear signal processing techniques a higher level enhancement component derived from harmonic components of high transition level frequency components of the signal stream located at a high frequency end of a higher level spectrum thereof, and combining the high level enhancement component with the video signal stream in order to extend the higher level spectrum beyond its original bandwidth.

These and other objects, advantages, aspects and features of the present invention will be more fully understood and appreciated upon consideration of the following detailed description of preferred embodiments, presented in conjunction with the accompanying drawings.

BRIEF DESCRIPTION OF THE DRAWINGS

In the Drawings:

FIG. 1 is a simplified block diagram of a full dynamic range video enhancer following a parallel path implementation in accordance with principles of the present invention.

FIG. 2A comprises three graphs progressively illustrating a spectrum expansion function of the FIG. 1 system along a common time base axis.

FIG. 2B comprises two frequency domain representations of the FIG. 2A expansion.

FIG. 2C is a first example of one arrangement for generating a spectrum expansion signal of the type graphed in FIG. 2A.

FIG. 2D is a second example of an arrangement for generating the FIG. 2A spectrum expansion spectrum.

FIG. 2E is a series of waveforms illustrating operation of the FIGS. 2C and 2D circuits.

FIG. 3 is a series of waveform graphs illustrating a gating methodology for generating a spectrum expansion enhancement signal from an incoming transition in a video signal stream.

FIG. 4 is a series of waveform graphs illustrating a delay method for generating a spectrum enhancement signal from an incoming transition in a video signal stream.

FIG. 5A comprises a series of graphs in the time domain for small transition and large transition of the operation of a detail processor within the FIG. 1 video enhancer.

FIG. 5B comprise a pair of graphs in the frequency domain illustrating small transition detail enhancement.

FIG. 5C is a graph of detail process enhancement as a function of incoming transition level in IRE units, further as a function of a controlled threshold.

FIG. 6 is a simplified block diagram of a full dynamic range video enhancer following a series path implementation in accordance with principles of the present invention.

FIGS. 7A-7C is a series of waveform graphs illustrating the effect within the FIG. 6 series path video enhancer of detail processing to spectrum expansion processing for medium amplitude transitions.

FIG. 8A is a series of waveform graphs illustrating overall full dynamic range operation of the FIGS. 1 and 6 video enhancer in the time domain.

FIGS. 8B and 8C is a series of waveform graphs illustrating overall full dynamic range operation of the FIGS. 1 and 6 video enhancer in the frequency domain.

FIG. 9A is a series of graphs illustrating operation of the FIGS. 1 and 6 video enhancer for low levels in the vertical domain.

FIG. 9B is a series of graphs illustrating operation of the FIGS. 1 and 6 enhancer for high transition levels in the vertical domain.

FIG. 10 is a block diagram of a video signal enhancement system employing a threshold circuit and the enhancer of FIGS. 1 or 6.

FIG. 11A is a block diagram showing inclusion of a threshold circuit of FIG. 10 before a detail processor of the FIGS. 1 or 6 enhancer.

FIG. 11B graphs the result of operation of the FIG. 11A threshold circuit arrangement upon the operating characteristics of the detail processor of the FIGS. 1 or 6 enhancer.

FIG. 12A is a simplified block diagram showing inclusion of the threshold circuit of FIG. 10 after the detail processor of FIGS. 1 or 6.

FIG. 12B graphs the result of operation of the FIG. 12A threshold circuit arrangement upon the operating characteristics of the detail processor of the FIGS. 1 or 6 enhancer.

DETAILED DESCRIPTION OF A PREFERRED EMBODIMENT

With reference to FIG. 1 a video enhancement system 10 in accordance with principles of the present invention includes a video input 12 for receiving an unenhanced video signal and provides a video output 14 which comprises full dynamic range enhanced video. A detail processor circuit 16 for signal processing of lower transition amplitude components, a spectrum expander circuit 18 for signal processing of higher transition amplitude components, and a delay match circuit 20 for a main path are arranged in a parallel configuration in the FIG. 1 embodiment 10. These three circuits respectively provide output paths 17, 19 and 21 which carry outputs to an adder circuit 22. The adder circuit 22 combines the outputs to provide the enhanced video output 14 in which video rise times have been reduced throughout the full amplitude dynamic range of the transitions in the unenhanced video signal, including at both lower and higher transition levels.

FIGS. 2A and 2B respectively illustrate in the time and frequency domains the desired operation of the spectrum expander circuit 18 in which enhances the higher transition level components. An input transition of limited bandwidth is enhanced by addition of an enhancement signal. An output transition is produced which has a significantly increased bandwidth. In the example of FIG. 2B, the input transition has a frequency spectrum extending to F0, whereas the expanded output transition has a frequency spectrum extending to F1. In practice a ratio of two is preferred for spectrum expansion in the frequency domain. A greater ratio leads to problems associated for example with unwanted sharpening of intentionally out-of-focus scenes and softly focused backgrounds.

With the operation of the spectrum expander circuit 18 in mind, it is apparent that the spectrum expander circuit 18 may be implemented in any one of a number of ways. As a first example, the circuit 18 may be implemented as shown in FIG. 2C. In this arrangement, a first differentiator 30 is connected to the input 12 and differentiates the incoming transition (waveform A of FIG. 2E) and puts out the differential (waveform B of FIG. 2E) on a path 31. A full wave rectifier 32 removes the sign of the differential and puts out an absolute value enhancement signal over a path 33 to a multiplier 34. At the same time, a second first differentiator 36 receives the differentiated signal put out on the path 31 from the first differentiator 30. A twice differentiated signal is then put out on a path 37, e.g., to an amplifier-limiter circuit 38 which amplifies and limits positive and negative excursions of the double-differentiated signal and puts out a multiplier gating signal (waveform C of FIG. 2E) on a path 39 to the multiplier 34. The resultant signal put out from the multiplier 34 on the path 19 is a signal transition having a sharply shortened duration (waveform D of FIG. 2E). FIG. 2D illustrates an alternate arrangement for the spectrum expander 18 in which the rectifier 32 is placed in the path between the upstream differentiator 30 and the downstream differentiator 36. These illustrations of FIGS. 2C and 2D are applicable to horizontal domain processing and are readily extrapolated to processing in the vertical domain. The techniques described in the present inventor's prior U.S. Pat. No. 4,030,121 are examples of these two approaches of FIG. 2. The disclosure of U.S. Pat. No. 4,030,121 is incorporated herein by reference.

Other implementations of the spectrum expander circuit 18 may employ gating techniques as functionally illustrated by the graphs of FIG. 3. The original transition (graph A of FIG. 3) is processed into a second differentiation signal (graph B of FIG. 3) as used in aperture correction for example. As shown in graph C of FIG. 3, when the differentiation signal is combined with the original transition, large preshoot (PS) and overshoot (OS) components are added to the transition and the enhanced transition is too long.

The gating approach takes the aperture correction waveform of graph B of FIG. 3 and develops a gating signal, graph D of FIG. 3. The graph signal D is positioned to be centered at the enhancement waveform and results in an enhancement waveform, graph E of FIG. 3, which does not have preshoot or overshoot. This signal is then combined with the original transition to produce an enhanced transition graph F of FIG. 3. The gating approach illustrated in FIG. 3 is particularly efficient for spectrum expansion in the vertical domain.

Another approach employs a delay time. A second differentiation of the incoming transition is obtained according to the methods of FIG. 2A or 2B. This signal is graphed as graph A of FIG. 4. This signal is then delayed by a predetermined delay D in a delay line. An undelayed, rectified component, graph A of FIG. 4 is then compared with a delayed, rectified component in an amplitude comparator circuit, and a first lesser amplitude signal is selected and put out from the comparator, as graphed in graph B of FIG. 4. The delay signal is again delayed and the process is repeated for the other polarity as shown in graphs C and D of FIG. 4. Waveform B is delayed and then compared with waveform D in a comparator circuit. The resultant is a spectrum expansion signal and is shown as graph E of FIG. 4. This signal is then combined in proper sign and phase with the original transition to obtain a resultant having a shortened transition duration.

Another approach is the one proposed by Goldmark et al. in the background documents referenced above. While these techniques build upon a second differentiation of the incoming transition waveform, (a signal necessarily limited by the bandwidth of the incoming signal), the resultant is an enhancement signal which is shorter in time than the original and which has frequency components which are higher than the original transition. Whatever approach is followed for spectrum expansion, it is safe to conclude that it will not work well at low levels.

The detail processor 16 (FIG. 1) operates under smaller transition amplitude components of the incoming video signal stream as graphed in FIG. 5A. The frequency domain representation shown in FIG. 5B shows that while rise times of the small level transition are shortened, there is no overall extension or expansion of the spectrum. Also, it should be noted that the FIG. 5B frequency domain representation is valid for the vertical domain, with the understanding that the frequency spectrum is reduced to the line-by-line pixel sampling rate, nominally the original line scan rate. FIG. 5C depicts the detail processing enhancement level as a function of input transition level. A threshold function may be included to eliminate detail processing of very small spectral components including random noise in the picture. The detail processor 16 may take any one of a number of forms, such as the approaches described in the present inventor's prior U.S. Pat. Nos.

4,262,304 and 4,847,681, the disclosures of which being incorporated herein by reference.

With reference to FIG. 7A, it is apparent that the detail processor 16 and the spectrum expander 18 operate in a complementary but nonexclusive fashion upon the incoming video signal so that the resultant output signal has been enhanced throughout the full dynamic range of transition amplitudes. By lower level signal is meant a range of transition amplitudes generally following the solid line curve DP of FIG. 7A. By higher level signal is meant a range of transition amplitudes generally following the dashed line curve SE of FIG. 7A. It should be apparent from FIG. 7A that the detail processor 16 continues to operate upon higher level signals but with a highly attenuated output, and likewise that the spectrum expander 18 continues to operate upon lower level signals with a highly attenuated output. There is no requirement that either the detail processor 16 or the spectrum expander 18 cease operation at any transition level, and the switch over in contribution between the two circuits as a function of transition amplitude is preferably continuous and smooth, as shown in FIG. 7A.

With reference to FIG. 6 a video enhancer 10, is illustrated in a series arrangement in which the detail processor 16 precedes the spectrum expander 18. In this arrangement, the output from the detail processor and an output 21A from a first delay 20A are combined in a first adder circuit 22A providing an output 23 which directly feeds the spectrum expander 18 and a second delay matching circuit 20B. An output from the second delay 20B on a path 21B is combined in a second adder circuit 22B with the output 19 from the spectrum expander 18 in order to provide the full-dynamic-range enhanced video output 14. As will be explained hereinafter, the FIG. 2 arrangement provides a number of advantages.

In practice, spectrum expansion can prove difficult to handle, particularly in terms of frequency response. For example, within a line doubler of the type described in the present inventor's U.S. Pat. Nos. 5,014,119 and 4,989,090 (the disclosures of which are incorporated herein by reference), rise times before spectrum expansion are on the order of 70 nanoseconds. After expansion, the rise times may well be below 25 nanoseconds. Within digital implementations, the clock for the spectral expansion function is therefore required to be in the vicinity of about 60 MHz. This high speed is very difficult presently to implement within large scale integrated circuits. So, there are advantages in placing the detail processor 16 upstream of the spectrum expander 18 as in the FIG. 6 approach.

The detail processor 16 does not extend the spectrum of the incoming signal, and may thus be readily implemented with digital circuitry otherwise clocked at the nominal rise time period of 70 nanoseconds. In this approach, a transition from the digital domain to the analog domain is made following the first adder 22A and before the spectrum expander 18. The spectrum expander 18 is then implemented in the analog domain.

Additionally, in the transition zone TZ, graphed as the shaded portion of the graph A of FIG. 7, the detail processor 16 tends to "prime the pump" for the spectrum expander 18 in the sense that the detail processor 16 begins the enhancement process for the mid-level transitions, and the spectrum expander 18 therefore receives a signal which already has a higher rise time. The result, graphed as graph D in FIG. 7 is a sharper picture than would be obtained by detail processing alone, graph C of FIG. 7. The slight preshoot and overshoot associated with the shortened transition of the graph D further add to the appearance of higher resolution at the mid-range transitional level.

The FIGS. 1 and 6 approaches are generic and work well in either the horizontal or vertical domain, In the vertical domain, however, the term "spectrum expansion" should be understood to mean the spatial equivalent within the picture display of the horizontal domain spectrum expansion. In the vertical domain, the vertically aligned picture elements (pixels) are isolated and obtained from successive scan lines by precise sampling intervals timed to occur at the line scan rate. Irrespective of the technique employed, the result is spatial transition shortening (i.e., reduced rise times) in the picture display, whether the transition lies in the horizontal domain, or whether it lies in the vertical domain.

FIG. 8 illustrates the results obtained from the synergistic combination of detail processing with spectrum expansion in accordance with principles of the present invention. FIG. 8A depicts in the left series of graphs time domain processing results for small transitions. These results are from the detail processor 16. The spectrum expansion results are graphed in the right series of graphs in FIG. 8A, and these results are provided by the spectrum expander 18. As shown in the left-side graph of FIG. 8B, for small transitions, the spectrum is shifted toward the upper frequency limits by inclusion of components resulting from a shorter rise time and from preshoot and overshoot components. The right-side graph of FIG. 8B illustrates overall increase in spectrum resulting from operation of the spectrum expander 18.

FIG. 9 illustrates operation of the present invention in the vertical domain. It should be remembered by the reader that a signal transition in the vertical domain may take as many as six or seven scan lines to complete. So, there are ample samples available to locate the transition and aid in its enhancement. After line doubling, a vertical transition should take at least four samples. Typically, six samples of a vertical domain transition following line doubling are observable. Thus, signal enhancement in the vertical domain is more efficiently performed following line doubling. FIG. 9A illustrates detail processing in the vertical domain which is necessarily somewhat coarse. An ENH+ signal is generated from an incoming signal IN. The EHN+ signal is then combined to provide an OUT signal as graphed in FIG. 9A.

For large level transitions, a gating window is established as shown in FIG. 9B, thereby eliminating samples lying outside of the window duration. The enhancement signal ENH+ of FIG. 9B is then added to the vertical signal, with the results as shown in the OUT graph of FIG. 9B. As is apparent for high transition levels, the shortened transition is smoother than the enhancement transition obtained at low level in the vertical domain.

A threshold may be provided in a controlled manner to eliminate enhancement of noise artifacts, for example. A video processing system 100 providing for a controlled threshold is shown in FIG. 10. The system 100 includes an input 102 and an output 104. The input 102 leads to a high pass filter circuit 106 which may be implemented as a second differentiator arrangement of the type shown in FIGS. 2A or 2B, for example. Following the high pass filter 106 is a threshold circuit 108 which is controlled by a control signal on a control line 110. The control signal establishes the threshold level imposed upon the signal put out from the filter 106 by the threshold circuit 108. The control may be manual, or it may be automatic and act in reference to detected noise level in the incoming picture signal stream. The enhancer 10 of FIG. 1 (or 10' of FIG. 6) then receives the high pass filtered/thresholded signal from the threshold 108. A delay matching circuit 116 delay matches a main signal path from the input 102 to an adder circuit 118. The adder circuit 118 combines in proper phase the signals from the enhancer 10 and from the delay match 116 to provide the enhanced output 104.

As shown in FIG. 11A, the threshold circuit 108 may be placed in signal stream before the detail processor 16, with the detail processing characteristics being modified by sideways movement as the threshold control 110 varies, as shown in the FIG. 11B graph. With the FIG. 11A approach, the detail processing levels remain unaltered for low mid-level transitions above the threshold. This approach results in very subtle changes in the picture as the threshold is varied. For example, as the threshold is increased, very low transition levels become fuzzy while midrange transitions become somewhat sharper, with a visual cancellation resulting in the eye-brain integration process of the viewer.

Alternatively, the threshold circuit 108 may follow the detail processor 16 as shown in FIG. 12A, and modify the detail process characteristics vertically as the threshold control 110 is varied, as shown in FIG. 12B. In this approach, overall detail processor operating characteristics vary directly with the change in the threshold control, and the results upon the picture are more visible to the viewer.

A threshold characteristic is usually deemed to be an inherent quality of the spectrum enhancer 18, as it acts only upon signal transition levels above some predetermined value as graphed in FIG. 7A for example.

To those skilled in the art to which the present invention pertains many widely differing embodiments will be suggested by the foregoing without departing from the spirit and scope of the present invention. The descriptions and disclosures herein are intended solely for purposes of illustration and should not be construed as limiting the scope of the present invention which is more particularly pointed out by the following claims.

What is claimed is:

1. A video enhancer for enhancing transitions within a video signal stream throughout a full dynamic range of said transitions comprising:
   an input for receiving the stream and an output,
   a main signal path between the input and the output,
   first enhancement means in parallel with the main path for generating a first video enhancement signal for the enhancement of lower level video signal transitions and for combining said first video enhancement signal with said main path, wherein the characteristics of said first video enhancement signal are such that, when combined with the main signal path the rise times of lower level transitions are shortened, but with substantially no accompanying increase in the overall spectral bandwidth,
   second enhancement means in parallel with the main path for generating a second video enhancement signal for the enhancement of higher level transitions and for combining said second video enhancement signal with said main path, wherein the characteristics of said second video enhancement signal are such that, when combined with the main signal path the rise times of higher level transitions are shortened, but with an accompanying increase in the overall spectral bandwidth while maintaining low preshoot and overshoot characteristics, and
   delay means within said main signal path to compensate for signal processing delays occurring in said first enhancement means and said second enhancement means.

2. The video enhancer set forth in claim 1 wherein said video enhancer is configured progressively to transition the output smoothly between said first enhancement means and said second enhancement means as a function of absolute amplitude of signal transition level within said signal stream.

3. The video enhancer set forth in claim 1 wherein said first enhancement means comprises detail processor means and wherein said second enhancement means comprises spectrum expansion means.

4. The video enhancer set forth in claim 1 wherein said first enhancement means is connected in parallel with said second enhancement means.

5. The video enhancer set forth in claim 1 wherein said first enhancement means is connected in series with said second enhancement means, and wherein said delay means includes one delay for delay matching said main signal path with delays of said first enhancement means and further includes another delay for delay matching said main signal path with delays of said second enhancement means.

6. The video enhancer set forth in claim 5 wherein said first enhancement means is connected upstream of said second enhancement means.

7. The video enhancer set forth in claim 6 wherein said first enhancement means is implemented with digital electronic circuitry and wherein said second enhancement means is implemented with analog electronic circuitry.

8. The video enhancer set forth in claim 1 wherein said first enhancement means, said second enhancement means, and said delay means are implemented with digital electronic circuitry.

9. The video enhancer set forth in claim 1 wherein said first enhancement means and said second enhancement means operate in a horizontal domain of said video signal stream.

10. The video enhancer set forth in claim 1 wherein said first enhancement means and said second enhancement means operate in a vertical domain of said video signal stream.

11. The video enhancer set forth in claim 1 wherein said first enhancement means and said second enhancement means operate in a horizontal domain and in a vertical domain of said video signal stream.

12. The video enhancer set forth in claim 1 included within a television receiver including scan line doubling means.

13. The video enhancer set forth in claim 12 wherein said first enhancement means is downstream of said scan line doubling means.

14. The video enhancer set forth in claim 13 wherein said first enhancement means and said scan line doubling means are implemented with digital circuitry and wherein said second enhancement means is implemented with analog circuitry.

15. The video enhancer set forth in claim 1 wherein said main signal path comprises a luminance path of a color composite picture signal, said picture signal having a luminance path and a chroma path.

16. The video enhancer set forth in claim 1 wherein said main signal path comprises a chroma path of a color composite picture signal, said picture signal having a luminance path and a chroma path.

17. The video enhancer set forth in claim 1 further comprising controlled threshold means for providing a threshold control for controlling operation of said first enhancement means.

18. The video enhancer set forth in claim 17 wherein said threshold means is upstream of said first enhancement means, and a threshold control of said threshold means displaces a transfer characteristic of said first enhancement means within a range of transition amplitude.

19. The video enhancer set forth in claim 17 wherein said threshold means is downstream of said first enhancement means, and a threshold control of said threshold means controls the magnitude of a transfer characteristic of said first enhancement means.

20. A method for providing full-dynamic-range enhancement of a video signal stream comprising the steps of:
generating a first video enhancement signal for the enhancement of lower level video signal transitions, wherein the characteristics of said first video enhancement signal are such that when combined with the video signal stream, the rise times of lower level transitions within the video signal stream are shortened, but with substantially no accompanying increase in the overall spectral bandwidth,
combining said first video enhancement signal with the video signal stream,
generating a second video enhancement signal for the enhancement of higher level transitions, wherein the characteristics of said second video enhancement signal are such that when combined with the video signal stream, the rise times of higher level transitions are shortened, but with an accompanying increase in the overall spectral bandwidth while maintaining low preshoot and overshoot characteristics, and
combining the second video enhancement signal with the video signal stream.

21. A video enhancer for enhancing transitions within a video signal stream throughout a full dynamic range of said transitions comprising:
first enhancement means for generating a first video enhancement signal for the enhancement of lower level video signal transitions and for combining said first video enhancement signal with said video signal stream, wherein the characteristics of said first video enhancement signal are such that when combined with the video signal stream, the rise times of lower level transitions are shortened, but with substantially no accompanying increase in the overall spectral bandwidth, and
second enhancement means for generating a second video enhancement signal for the enhancement of higher level transitions and for combining said second video enhancement signal with said video signal stream, wherein the characteristics of said second video enhancement signal are such that when combined with the video signal stream, the rise times of higher level transitions are shortened, but with an accompanying increase in the overall spectral bandwidth while maintaining low preshoot and overshoot characteristics.

22. A method for providing a full-dynamic-range enhancement of a video signal stream comprising
generating a first video enhancement signal for the enhancement of lower level video signal transitions, wherein the characteristics of said first video enhancement signal are such that when combined with said video signal stream, the rise times of lower level transitions are shortened, but with substantially no accompanying increase in the overall spectral bandwidth,
combining said first video enhancement signal with the video signal stream,
generating a second video enhancement signal for the enhancement of higher level transitions, wherein the characteristics of said second video enhancement signal are such that when combined with said video signal stream, the rise times of higher level transitions are shortened, but with an accompanying increase in the overall spectral bandwidth while maintaining low preshoot and overshoot characteristics, and
combining said second video enhancement signal with said video signal stream.

* * * * *